United States Patent [19]

Fegraus et al.

[11] 4,161,116
[45] Jul. 17, 1979

[54] INERTIA AND ROAD LOAD SIMULATION FOR VEHICLE TESTING

[75] Inventors: Clark E. Fegraus; Severino D'Angelo, both of Laguna Beach, Calif.

[73] Assignee: Automotive Environmental Systems, Inc., Westminster, Calif.

[21] Appl. No.: 835,225

[22] Filed: Sep. 21, 1977

Related U.S. Application Data

[63] Continuation of Ser. No. 718,917, Aug. 30, 1976, abandoned.

[51] Int. Cl.$^2$ .................. G01M 17/00; G01L 3/22
[52] U.S. Cl. .......................... 73/117; 73/134
[58] Field of Search ........................ 73/117, 134

[56] References Cited

U.S. PATENT DOCUMENTS

| | | | |
|---|---|---|---|
| 2,054,076 | 9/1936 | Folsom | 73/134 |
| 2,785,367 | 3/1957 | Roman et al. | 73/134 X |
| 2,982,128 | 5/1961 | Gibson et al. | 73/117 |
| 3,554,022 | 1/1971 | Geul | 73/117 |
| 3,913,394 | 10/1975 | Niehaus | 73/134 X |
| 3,940,978 | 3/1976 | Akkerman et al. | 73/117 |

FOREIGN PATENT DOCUMENTS 992333  5/1965  United Kingdom .................. 73/134

Primary Examiner—Charles A. Ruehl
Attorney, Agent, or Firm—Jackson, Jones & Price

[57] ABSTRACT

Prior art electromechanical inertia and road load simulators as applied in dynamometers measure speed and acceleration, then compute and control torque—a relatively slow and inaccurate operation. This invention measures torque, then computes and controls acceleration and speed—a fundamentally different approach which provides faster action, more accurate simulation and closer repeatability. The simulator described herein includes and is controlled by a computer which is provided with inputs from a torque transducer, a speed encoder and operator entered digital signals. The computer then makes accurate and rapid computations of vehicle inertia, road load forces and generates an electrical speed control signal. This signal is provided to a controller for a power absorber, e.g., a direct current power controller which drives a direct current motor. The power absorber such as the motor is mechanically coupled to the vehicle engine or a rotating roll upon which a test vehicle drive wheel rests. Effects of cooling due to vehicle velocity may be provided by a cooling fan which is mounted in front of the test vehicle and which is hydraulically coupled to the rotating roll.

42 Claims, 13 Drawing Figures

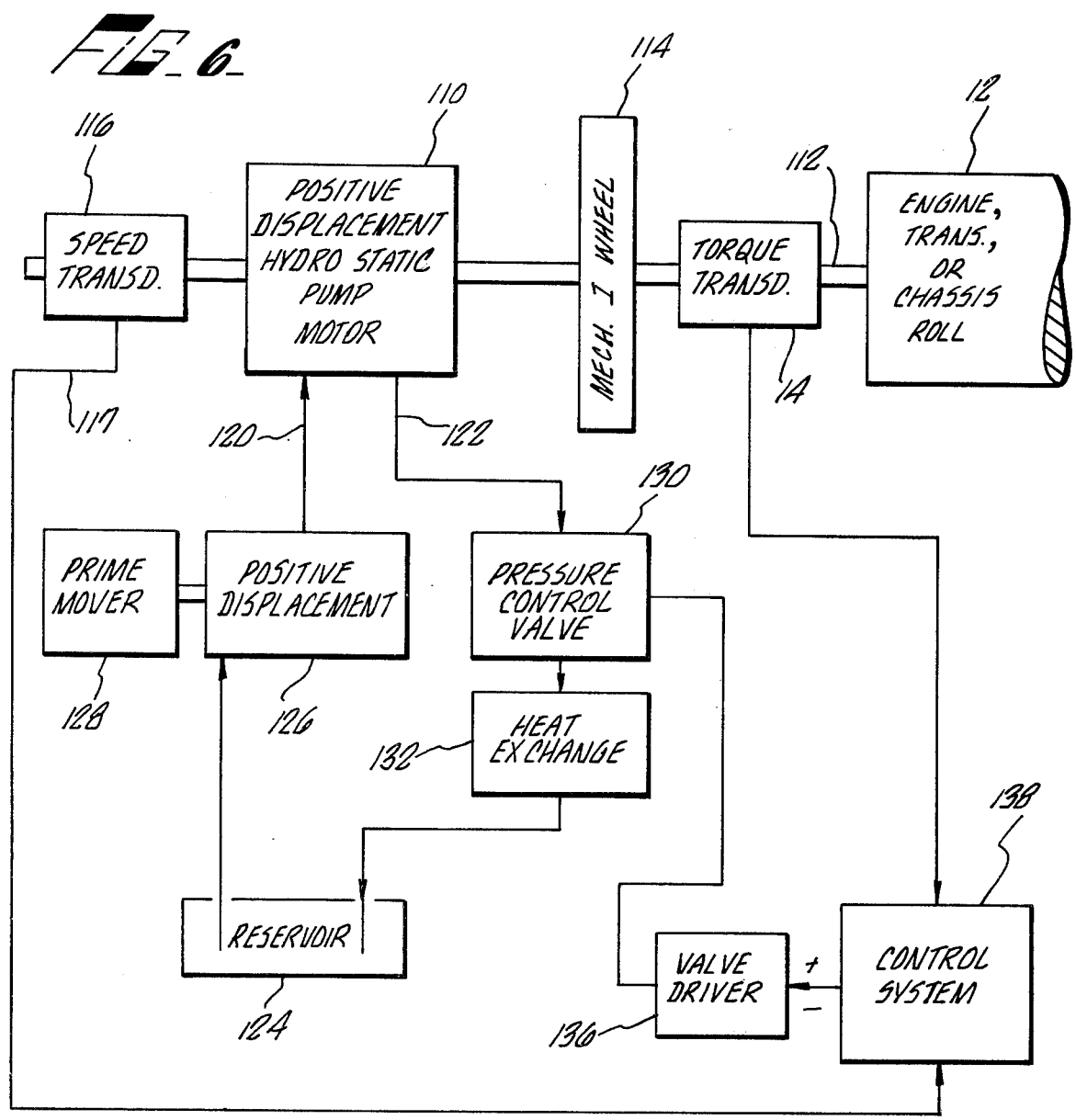
FIG_6_
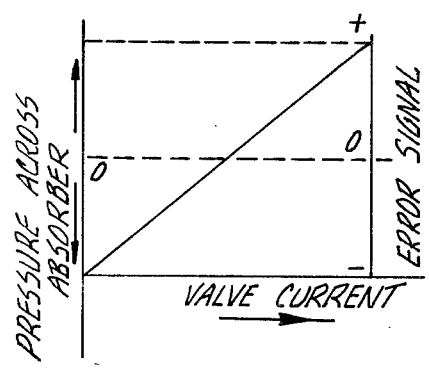
FIG_7_

INERTIA AND ROAD LOAD SIMULATION FOR VEHICLE TESTING

CROSS REFERENCE TO RELATED APPLICATIONS

This application is a continuation in part of Ser. No. 718,917, filed Aug. 30, 1976, now abandoned.

BACKGROUND OF THE INVENTION

1. Field of the Invention

The present invention is related to dynamometers and more particularly to electromechanical simulation of vehicle inertia and road load during vehicle testing on a dynamometer.

2. Brief Description of the Prior Art

Dynamometers are often used in vehicle testing where operation in place is desired. Because such test vehicles are not actually moving, means must be found to simulate certain parameters associated with the vehicle and its operation on the road. These parameters represent the forces required to accelerate the vehicle or sustain any speed.

Inertial forces, referred to herein as the parameter inertia, are a function of vehicle mass. Inertial forces must be overcome by the vehicle engine in order to achieve acceleration or deceleration. To sustain any speed, the vehicle engine must overcome forces which are related to the velocity of the vehicle. These forces, referred to herein as road load, include breakaway friction, rolling friction (as in bearings and tire of road friction), and windage (as in drag forces exerted on the vehicle by air). The purpose of the simulator is to impose forces upon the vehicle which represent those forces the vehicle would normally incur on the road. In the past, inertia simulation has been accomplished to some degree by adding a number of mechanically combinable flywheels to the dynamometer system. Road load is often simulated with hydrokinetic devices, pumps, electric brakes or electric motors. Most often multiple flywheels are used in conjunction with a road load simulating device. In some cases, an electric motor/generator is added to the system to provide electrically controlled loading and motoring. Sometimes a single flywheel and electric motor are used with the motor controlled to increase or decrease the inertia forces as determined by the operator.

Purely mechanical simulators (flywheel systems) provide accurate inertia simulation but are expensive. Changes must be made mechanically by clutching various flywheel combinations in and out of the mechanical train. Furthermore, the number of possible combinations is limited, depending on the number and sizes of wheels employed. Beyond this, the exact inertia is solely dependent upon the manufacturer's ability to calculate the moment of inertia of the flywheel, bearings, clutches, shafts and other components which rotate in the dynamometer. This is very difficult because of the various shapes, sizes and densities of these components. Accurate verification of the exact inertia is essentially impossible by the user, and no means of calibrating the inertia is available.

Prior art electromechanical inertia simulators are not considered as accurate as mechanical simulators. Present control systems are based on measurement of roll speed and subsequent computation of acceleration, and development of a torque control signal. Since this operation is essentially a differentiation of a parameter (velocity), which is changing slowly relative to the cause of the change—torque, there is a substantial time delay inherent in the system between roll speed change and inertia correction. Reported inertia response times (to 90 percent of value) are 0.5 seconds. There is also a settling time which ranges from 1 and 5 second depending upon differences between the desired inertia value and the inherent mechanical inertia of the dynamometer system upon the degree of change in vehicle torque.

In summary, presently available electromechanical dynamometer systems provide steady state inertia accuracies of the order of ±5 percent (vs ±1-3 percent for flywheel systems) and response times of the order of 0.5 seconds (vs negligible response time for flywheel systems). Duplication of road load forces is accomplished within ±3 percent (vs ±10-30 percent for hydrokinetic or brake type road load simulation).

At the present time, there is a need for more precise, accurate and fast response simulation of vehicle inertia and road load effects because of current U.S. Environmental Protection Agency rules defining test conditions during the monitoring of vehicle exhaust emissions. Further, the need exists to verify the accuracy of the inertia and road load simulation.

OBJECTS AND SUMMARY OF THE INVENTION

The present invention is an electromechanical dynamometer system which provides steady state inertia inaccuracies of the order of ±0.5 percent (vs ±1-3 percent for flywheel system and ±5 percent for prior art electromechanical systems). Response time is negligible (equivalent to flywheel systems and faster than prior art electromechanical system response of 0.5 seconds). Duplication of road load forces is accomplished within ±1 percent (vs ±3-5 percent for prior art electromechanical systems and ±10-30 percent for hydrokinetic or brake type road load simulators).

To achieve the above performance, a single flywheel, a direct current (DC) motor, a DC power controller, and a computer control system are used. Control is based on measurement of torque and speed, and computation of acceleration. Faster response and higher accuracy than provided by prior art systems results because the control signal is derived from the integration of the torque input—a rapidly changing parameter—which may therefore be applied more quickly to effect changes in systems loading. The DC motor is used as a power absorption and motoring supplement to the single flywheel both of which are mechanically coupled to a rotating roll upon which a test vehicle drive wheel rests. Appropriate vehicles include motorcycles, automobiles, trucks, buses, and other motor vehicles. A hydraulic pump is also mechanically coupled to the rotating roll and is used to drive a hydraulic motor which powers a cooling fan mounted in front of the test vehicle. The fan provides a cooling effect similar to that which a vehicle normally encounters on the road at various speeds. This pump also exchanges energy with the roll, thus reducing the total inertia and road load forces which must be supplied by the DC motor and flywheel.

Precise simulation of vehicle inertia and road load is achieved by precise control of the speed of a DC motor. This control is effected by the power controller which in turn is controlled by an analog computer which is provided with inputs from a torque transducer and a speed encoder, and with digital signals from other devices which may be manual or pre-programmed with values for vehicle inertia and road load coefficients. Computation of road load forces (RL) is made according to the formula $$RL = A + BV + CV^m$$

wherein, A, B and C represent the effects of such factors as breakaway torque, friction and windage, and V represents velocity. From the construction of inertia and road load force, then, vehicle acceleration and speed are computed according to the formula $$V_1 - V_0 = \int_{t_0}^{t_1} \frac{F - RL}{I} dt$$

wherein $V_1$=computed velocity at time $T_1$, $V_0$=the velocity at time $t_0$, F=the measured torque, and I represents the simulated vehicle inertia. The computed speed $V_1$ is compared with actual speed to provide an error signal which is then fed to the power controller to control the DC motor speed as above. The control system of the present invention may also be applied to other types of conventional power absorbers such as a positive displacement hydrostatic pump/motor, a hydrokinetic power absorber, an eddy current power absorber and a mechanical friction brake absorber.

BRIEF DESCRIPTION OF THE DRAWINGS

The above-mentioned objects and advantages of the present invention will be more clearly understood when considered in conjunction with the accompanying drawings, in which:

FIG. 3 is a logic diagram of a signal conditioning unit shown in FIG. 2.

FIG. 3a is a logic diagram of a signal conditioning unit shown in FIG. 2.

FIG. 3b is timing diagrams relating to points on FIG. 3a.

FIG. 6 is a block diagram of a system for controlling a positive displacement hydrostatic pump/motor absorber in accordance with the present invention.

FIG. 7 is a diagram of valve current vs. differential pressure across the absorber of FIG. 6.

DESCRIPTION OF THE PREFERRED EMBODIMENT

Figure 1:
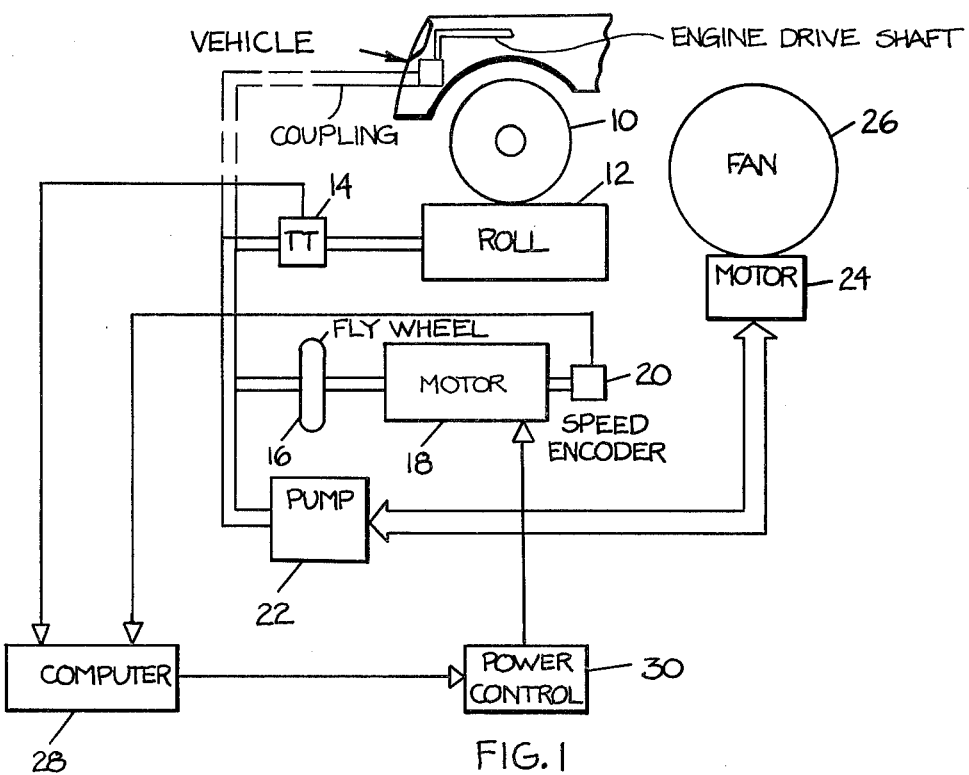
FIG. 1 is a basic block diagram of one embodiment of a system which constitutes the present invention in which an electric motor is utilized as the power absorber and driver.

Referring now to FIG. 1, the drive wheel 10 of the vehicle is mounted upon a roll or roller 12. A torque transducer 14 is physically connected with the roll 12 and senses the torque being transmitted through the roll 12 from the vehicle wheel 10. A flywheel 16 is also mechanically coupled to the torque transducer 14 and adds an inertia effect to the system shown in FIG. 1. The moment of inertia of the flywheel 16 is selected so that the cumulative moment of inertia of the system including the roll 12, mechanical couplings and the flywheel corresponds to the mid-point of the moment of inertia range to be simulated. The particular vehicle tested may have a greater or lesser mass than the effect of the moment of inertia of the flywheel and roller. In such an event the difference is made up by the DC motor 18 as will be explained hereinafter. A speed encoder 20 is mechanically coupled to the shaft of the DC motor 18 and generates a real time speed signal for a computer 28 also to be discussed hereinafter. The computer has a second input from the torque transducer 14 so that the computer is fed, in real time, the actual torque being transmitted through the roll 12. In order to maintain the proper torque for a given speed, the power control unit 30, to be discussed hereinafter, governs the energization of the DC motor 18 so that an appropriate torque and speed point may be generated during testing. The power control unit 30 is capable of operating the DC motor 18 in a motoring mode or a generating mode.

In addition to the aforementioned components, a hydraulic pump 22 is coupled with the torque transducer 14 and drives a mating hydraulic motor 24 that is remotely situated in front of a vehicle, associated with wheel 10. The motor 24 hydraulically drives a large fan 26 which blows air in the direction of the vehicle to simulate the cooling effect of a wind at a particular speed. As the roll 12 increases its speed, so will the fan 26. The pump 22 presents a load to the roll 12 and its interconnected mechanical coupling. As a result of this particular connection, the hydraulic pump contributes some of the force needed to provide for inertia and road load simulation, the remainder of which is provided by the DC motor 18, flywheel 16, and roll 12.

The torque transducer 14 measures the torque transmitted from the roll 12 to the flywheel 16, pump 22, and DC motor 18. Friction and windage losses in the mechanical linkage between transducer 14 and motor 18 are also measured by transducer 14. The output of the torque transducer is the input to computer 28 where it is used to compute speed and acceleration or deceleration. A difference speed signal is then developed which takes into account any difference between computed and actual speed and this signal is fed to the power control unit 30 which, in turn, controls speed of the DC motor 18.

Figure 2:
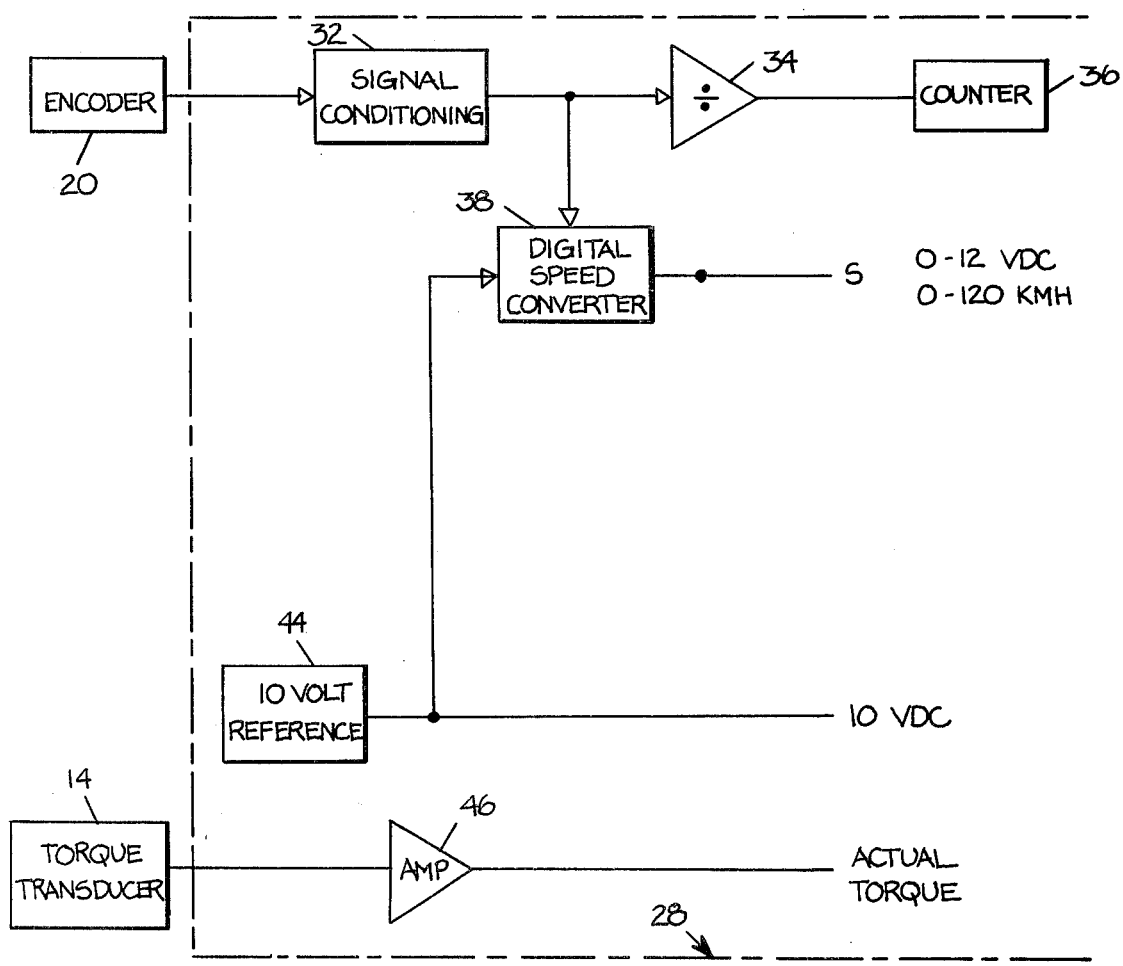
FIG. 2 is a partial block diagram of the computer portion shown in FIG. 1.

Referring to FIG. 2, the input to computer circuitry from the encoder 20 and the torque transducer 14 is illustrated. The encoder 20 provides an analog signal to a signal conditioning unit 32 to be explained hereinafter. The basic purpose of the signal conditioning unit 32 is to function as an analog-to-digital converter. The output from the signal conditioning unit 32 is a pulse output which undergoes division at the digital divider 34 which achieves a scaling factor. The output from the divider 34 feeds a counter 36 which may be coupled to a conventional digital readout. The purpose of the counter 36 is to provide a distance output or distance relation to the encoder 20. The counter 36 may be likened to an odometer. A second output from the signal conditioning unit 32 is fed to a digital speed converter 38 which is discussed in greater detail hereinafter. The digital speed converter has an analog output which is used elsewhere in the computer. The differentiating circuit is of conventional design and provides an analog signal corresponding to acceleration. This signal is used for regulating purposes elsewhere in the computer. A 10-volt reference source of conventional design is generally indicated by reference numeral 44 and provides a reference input to the digital speed converter 38 as necessary. Also, it furnishes a reference voltage to other portions of the circuitry. The torque transducer 14 has its output amplified by the amplifier 46 thereby presenting an analog signal corresponding with actual torque to summing circuit 60 (FIG. 5), further explained hereinafter.

Figures 3A, 3B:
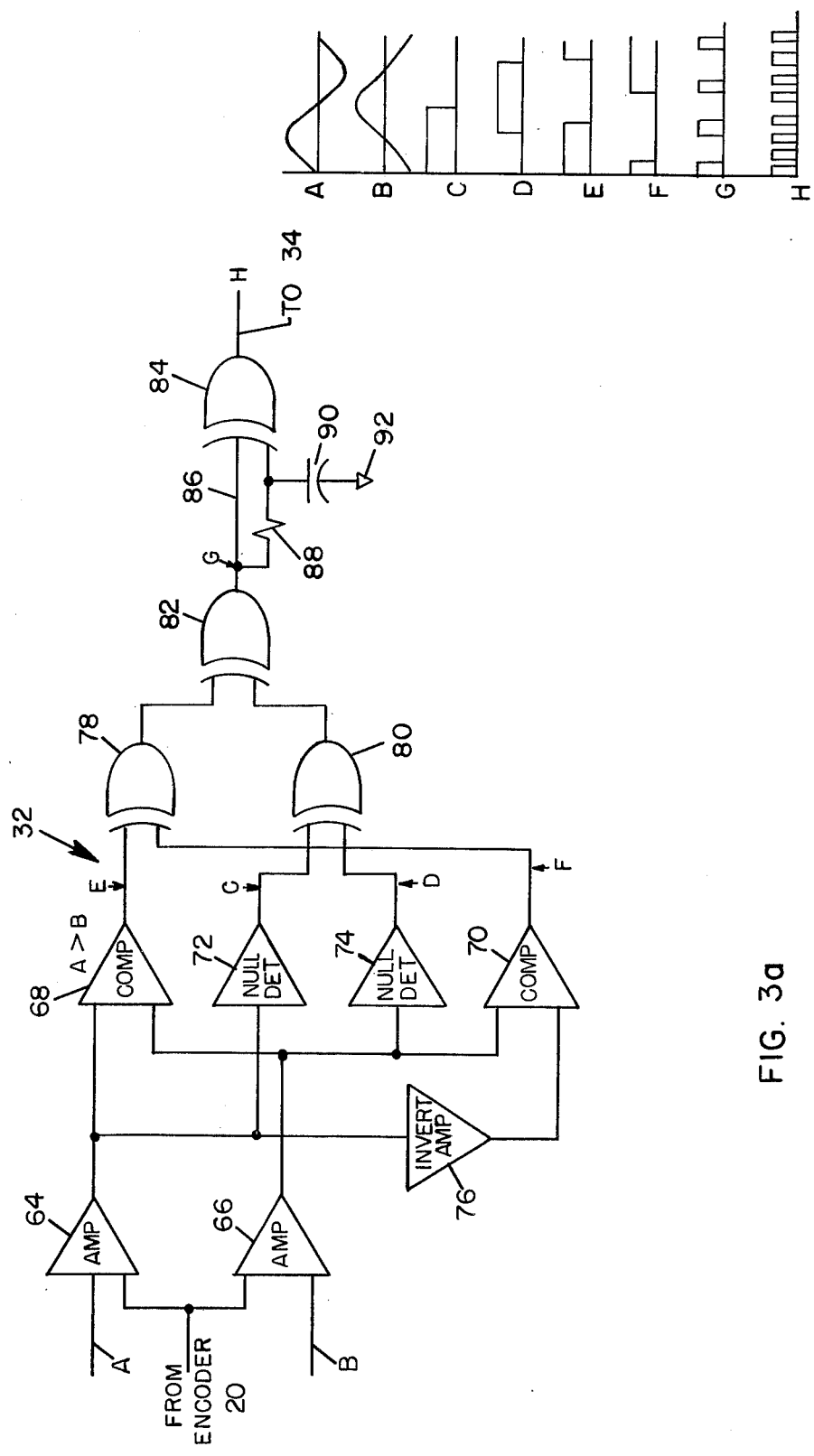

FIG. 3a illustrates the logic circuitry which was previously indicated by block diagram 32 in FIG. 2. As previously explained, the circuitry serves as a signal conditioning unit 32 accepting the three-wire output from a conventional encoder 20 and performing an analog-to-digital conversion. The converted signal from the signal conditioning unit is fed to the divider 34, and digital speed converter 38 shown in FIG. 2. The signal conditioning unit 32 includes a pair of amplifiers 64 and 66 which are fed sine waves shown as Plots A and B. A first comparator 68 compares the first input thereof, from amplifier 64, to the second input thereof which is from the amplifier 66. If the amplitude of the "A" signal exceeds the magnitude of the "B" signal, an output is generated by the comparator and the output plot may be seen as Plot E in FIG. 3b. The "A" signal from the amplifier 64 is inverted through an inverting amplifier 76 and the output from this amplifier provides a first input to a second comparator 70. A second input to the latter-mentioned comparator 70 is the "B" signal from amplifier 66. The output from the latter-mentioned comparator 70 is seen as Plot F in FIG. 3b. The signals "E" and "F" are fed as inputs to gate 78 for performing an Exclusive OR logic function. A conventional null detector 72 has its input connected to the output of amplifier 64 which carries the "A" signal. A second null detector 74, identical to detector 72, is connected to the output of amplifier 66 which corresponds to the signal "B." The output from the null detectors 72 and 74 are shown as Plots C and D in FIG. 3b.

The signals "C" and "D" also undergo an Exclusive OR operation through gate 80. The outputs from the Exclusive OR gates 78 and 80 drive a subsequent Exclusive OR gate 82 and the signal present thereat is indicated by "G" and shown in Plot form in FIG. 3b. Signal "G" is fed along line 86 to a first input of a final Exclusive OR gate 84. A delay circuit is connected between the output of gate 82 and a second input of gate 84. The delay circuit includes a resistor 88 connected at a first terminal to the output of gate 82 and at a second terminal to the second input of gate 84. A capacitor 90 is connected between the second input of gate 84 and ground 92. The final pulse output of the signal conditioning unit 32 occurs at the output of the gate 84 and the signal thereat is shown in Plot H in FIG. 3b.

Figure 4:
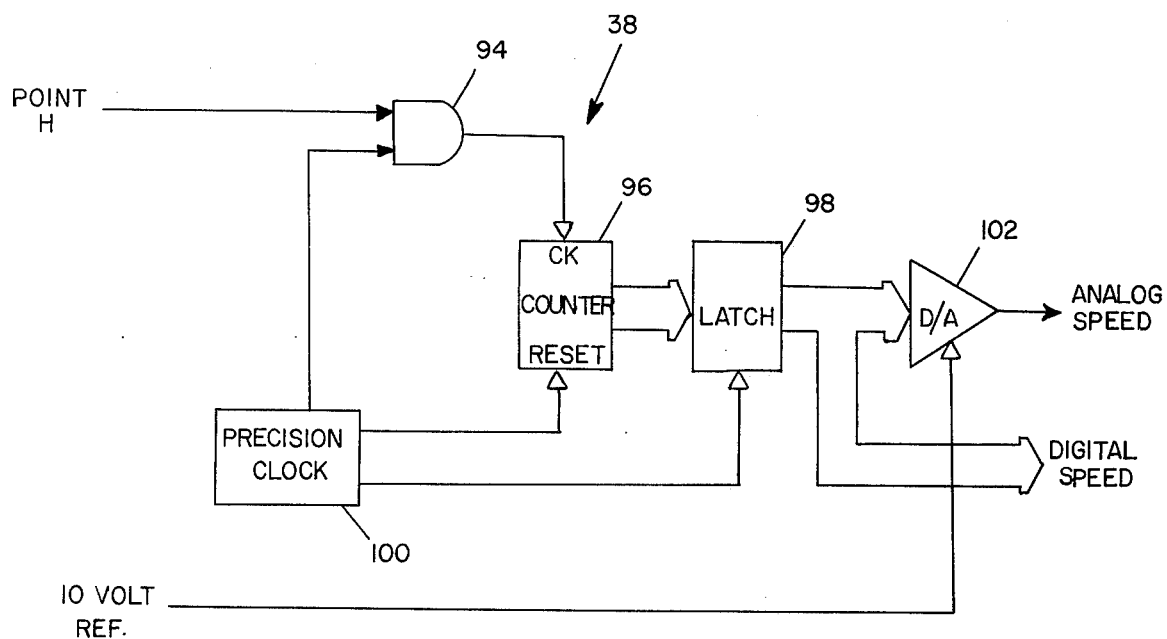
FIG. 4 is a logic block diagram of the digital-speed converter shown in FIG. 2.

Referring to FIG. 4, the specific circuitry for the digital speed converter 38 is shown. A first input to AND gate 94 is derived from the Exclusive OR 84 of FIG. 3a. The AND gate 94 drives the counter 96 until a clock pulse from the precision clock 100 resets the counter 96. Prior to resetting, the contents from the counter 96 are transferred to a conventional latch 98 by virtue of a transfer signal also coming from the precision clock 100. The digital information in latch 98 is connected to the input of a D/A converter 102 which converts the digital input to the analog signal which was previously explained as the analog output of the digital speed converter 38 in FIG. 2. The D/A converter 102 is provided with a second input from the reference voltage as illustrated in FIG. 4.

Figure 5:
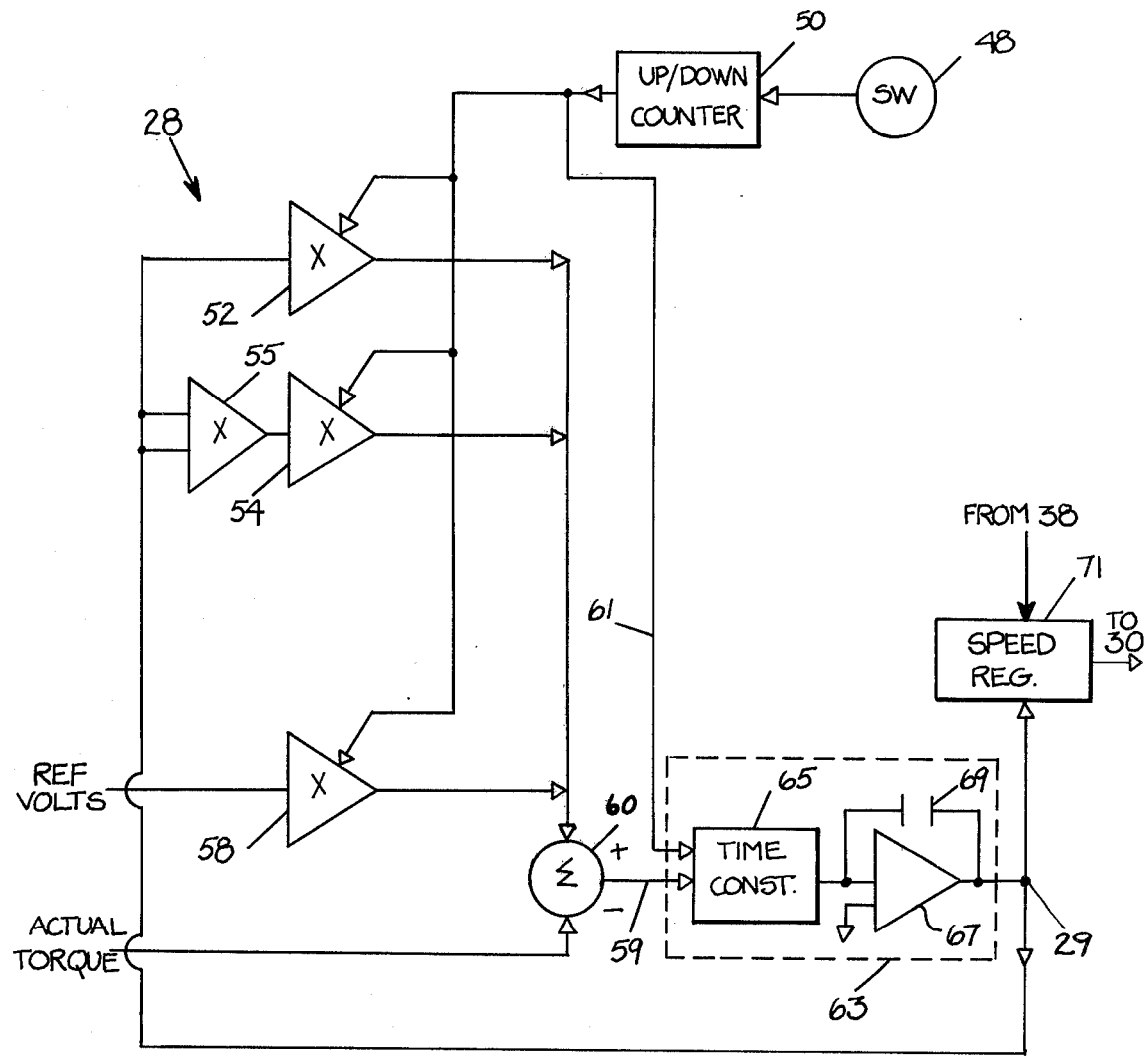
FIG. 5 is a block diagram of the output portion of the computer shown in FIG. 1 and is connected with the computer portion shown in FIG. 2.

In FIG. 5 test vehicle inertia is selected by use of a switch 48 which may be of conventional push button or toggle switch type. The switch 48 drives an up/down counter 50 that provides a digital signal corresponding with the selected inertia for the tested vehicle. The digital signal from the counter 50 is provided to a number of conventional digital multiplier circuits, such as 52, 54, and 58. In the instance of the first multiplier 52, the analog signal corresponding to speed from the integrator 63 to be explained hereinafter is also inputed to the multiplier 52. An analog output will result. By virtue of the multiplication between the analog and digital signals in multiplier 52 the second term of the previously stated road load equation is derived. Similarly, the multiplier 54 multiplies a digital signal from the counter 50 and the square of speed input from multiplier 55 to derive the third term of the road load equation in analog form. Multiplier 55 is a conventional analog multiplier used here as a squaring device to achieve the square of the speed at its output. A reference voltage is fed to a first input of multiplier 58 along with a second digital input, from the counter 50, which results in a constant "A" or the initial term of the road load equation. The summing circuit 60 adds the outputs from multipliers 52, 54 and 58 and subtracts the result (RL) from the actual torque signal (F). The output signal from the summing circuit 60 is a net or difference torque signal 59 (F−RL), and is fed to the first input of integrator 63.

In addition to the three terms of the road load equation, terms due to inertia must be included. The second input 61 to the integrator 63 comes from the output of the counter 50. The signal 61 is proportional to the inertia selected on counter 50.

The integrator 63 is of a conventional type and utilizes a programmable time constant 65 which may be in the nature of a plurality of resistors that are selectively switched into a time constant circuit, depending upon the input 61 to the programmable time constant 65. Therefore, the time constant is directly proportional to the selected inertia. The output from the programmable time constant 65 is fed to a conventional operational amplifier, including the amplifier component 67 and the capacitor 69.

The output of the integrator 63 equals $$\frac{1}{RC}\int$$

input voltage on line 59 with respect to time; where R equals the resistance value selected by the time constant 65 and C equals the value of the capacitor 69. Since R is representative of the selected simulated inertia and the voltage on line 59 is representative of the difference between the measured and road speed load torque (F−RL), the integrator 63 provides an output representative of $$\frac{1}{T} \int_{t_0}^{t_1} (F - RL)\, dt.$$

The output 29 of integrator 63 is thus a computed speed signal with a rate of change directly proportional to the difference torque signal 59 and inversely proportional to the inertia signal 61. The output from the integrator 63 is fed to a speed regulator 71 which may be a conventional operational amplifier. A second input to the speed regulator comes from the digital speed converter 38 (FIG. 2). The speed regulator 71 compares the actual speed from the converter 38 with the computed speed signal from integrator 63 so that the speed regulator may make certain that the speed signal computed by the integrator 63 and the actual speed as measured by converter 38 are identical. This is done by controlling the signal to the power control unit 30 which, in turn, controls the speed of DC motor 18, so that the actual speed signal from converter matches the computed speed signal 29. Thus, the DC motor 18 provides the necessary absorbing or motoring torque to precisely simulate inertia and road load.

Although the embodiment of FIGS. 1–5 was explained in connection with a DC motor 18, it is to be understood that an AC may be used instead as will be recognized by those of skill in the art.

As a further alternative, the present invention may be utilized in testing automobile engines that might be set on a test block. This is schematically illustrated by the dotted coupling shown in FIG. 1, which shows a coupled connection between the engine driveshaft and the shaft of motor 18. The structure would be the same with the exception that roll 12 and its shaft would not be necessary since only a vehicle engine is being tested. The operation of the device would be identical to that outlined.

The following compilation lists various components mentioned in this specification, which are stock items:

| Component | Manufacturer/Model Number |
|---|---|
| 14 | Lebow, Inc./1104-5K |
| 18 | ASEA/LAK 159 LA |
| 20 | Dynamics Research Corp./77-30-BOO-500 |
| 22 | Borg Warner/P 15 |
| 24 | Borg Warner/M 15 |
| 26 | Chicago Blower Corporation |
| 30 | Sabina Electric & Eng. Co./RG 7400 |
| 52, 54, 58, 102 | Micro Network/MN 312H |
| 55 | Analog Devices/AD 533J |
| 96 | RCA/CD-4520 |
| 98 | RCA/CD-4508 |

Referring now to FIG. 6, there is illustrated a system for controlling a positive displacement hydrostatic pump/motor 110 in accordance with the present invention. The hydrostatic pump/motor 110 is coupled to the dynamometer roll 12 by a suitable shaft 112. The pump/motor 110 may be of the positive displacement piston or vane type marked by Vickers, a division of Sperry Rand Corporation, and described in pages 26, 27, 48 and 49 of the testbook entitled "Principles of Hydraulics," by George Altland, and published in November 1965 by Vickers Incorporated (now a division of Sperry Rand Corporation). A mechanical inertia wheel 114 is connected to the shaft 112 to provide at least a portion of the desired simulated inertia for the vehicle under test. A speed transducer 116 is also coupled to the shaft 112 to provide an analog output signal on line 117 which is proportional to the rotational speed of the shaft 112, the roll 12 and the vehicle wheels which engage the roll 12. If desired, the shaft 112 may be coupled directly to the automobile engine when it is desired to test an engine that has not been mounted in a vehicle. A torque transducer 14 is connected between the flywheel 114 and the dynamometer roll 12 as shown.

The hydrostatic pump/motor 110 has a fluid inlet line 120 and fluid outlet line 122. Fluid is supplied to the inlet line 120 from a reservoir 124 through a positive displacement pump 126. The pump 126 is driven by a prime mover 128 to provide a predetermined fluid pressure at the inlet line 120. The outlet line 122 is returned to the reservoir 124 through a pressure control valve 130 and a heat exchanger 132. The pressure control valve 130 may be of the Vickers remote electrically modulated type in which the pressure across the valve is determined by the magnitude of an electrical current applied to its control circuit 134. The control circuit 134 of the pressure control valve 130 is connected to the output of a valve driver 136.

Figure 8:
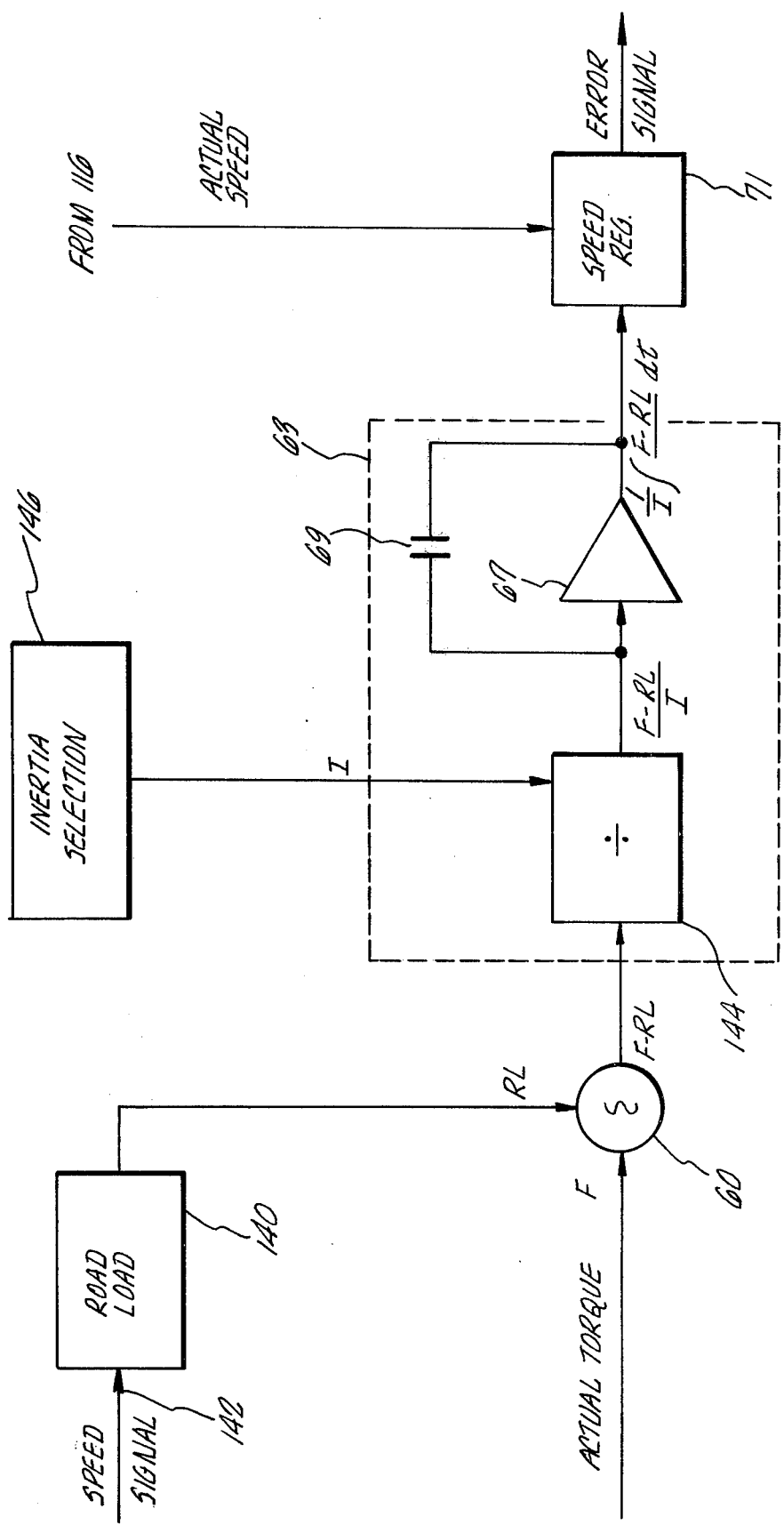
FIG. 8 is a block diagram of a control system which may be used in the embodiments of FIGS. 6, 9, 10, 11 and 12.

A control system 138 which may be, for example, of the type illustrated in FIGS. 5 or 8 receives as its input the measured torque signal from the torque transducer 14 and the measured speed signal from the speed transducer 116. The output of the control system is an error signal that represents the difference between the computed and actual speed signals. This error signal is applied to the valve driver 136.

The operation of the valve driver is illustrated in FIG. 7. FIG. 7 is a diagram of the output current from the valve driver 136 plotted against the input error signal and the pressure differential across the hydrostatic pump/motor 110 as illustrated. As shown in FIG. 7, when the input error signal to the valve driver 136 varies from a negative to a positive value, the output current from the valve driver 136 varies from zero to a maximum current. When the error signal is zero, the output current from the valve driver 136 is a fraction, for example one-half, of its maximum value.

The pressure differential across the hydrostatic pump/motor 110 varies from a negative to a positive value in accordance with the opening in the pressure control valve 130 which opening is controlled by the error signal as discussed above. When the pressure differential across the hydrostatic pump/motor 110 is positive, i.e., when the pressure at the outlet line 122 is higher than the pressure at the inlet line 120, the unit 110 functions as an absorber and visa versa.

Referring now to FIG. 8, there is illustrated a circuit which may be used as the control system 138 in FIG. 6. This circuit is a simplified version of the control circuit shown in FIG. 5. A road load circuit 140 receives a speed signal from its input 142 and provides an output signal to one input of the summing circuit or junction 60 which is proportional to the desired road load torque for the vehicle engine test. It should be noted that while the road load circuit 140 is illustrated as being responsive to speed, this circuit could provide a simulated road load torque signal which (1) is constant, (2) varies with time, or (3) varies in accordance with another parameter. The road load torque may even be zero for certain types of tests.

The summing junction 60 receives as its second input a signal from the torque transducer 14 labled "actual torque." The output of the summing junction 60 represents the actual torque (F) minus the road load torque (RL). This difference difference or net torque signal is applied to the integrator 63 which includes a divider circuit 144. The divider circuit 144 is also coupled to an analog inertia selection circuit 146 to provide an output signal which represents the difference torque signal divided by a signal representing the selected simulated inertia from the circuit 146, i.e., (F−RL/I). The divider circuit 144 functions in the same manner as the time constant circuit 65 of FIG. 5, except that its input from the inertia circuit is analog instead of digital.

The output of the divider circuit 144 is applied to the input of an operational amplifier 67 which includes an integrating capacitor 69 connected from the output to the input thereof. The output of the integrator 63 represents the integral of the difference torque signal with time divided by the simulated inertia (I), i.e., $$\int_{t_0}^{t_1} \frac{F-RL}{I} dt.$$

This signal also represents the computed speed of the vehicle engine under test.

The computed speed signal and the actual speed signal from the speed transducer 116 are applied to the differential amplifier 71 to provide an error signal which controls the valve driver 136 of FIG. 6 in the same manner described above.

In the system of FIG. 6, the differential pressure across the hydrostatic pump/motor 110 is controlled so that the actual speed as measured by the transducer 116 matches the computed speed signal from the integrator 63. The hydrostatic pump/motor 110 provides the necessary absorbing and motoring torque to simulate the selected inertia in conjunction with the inertia wheel 114 and the simulated road load torque provided by circuit 140.

Figure 9:
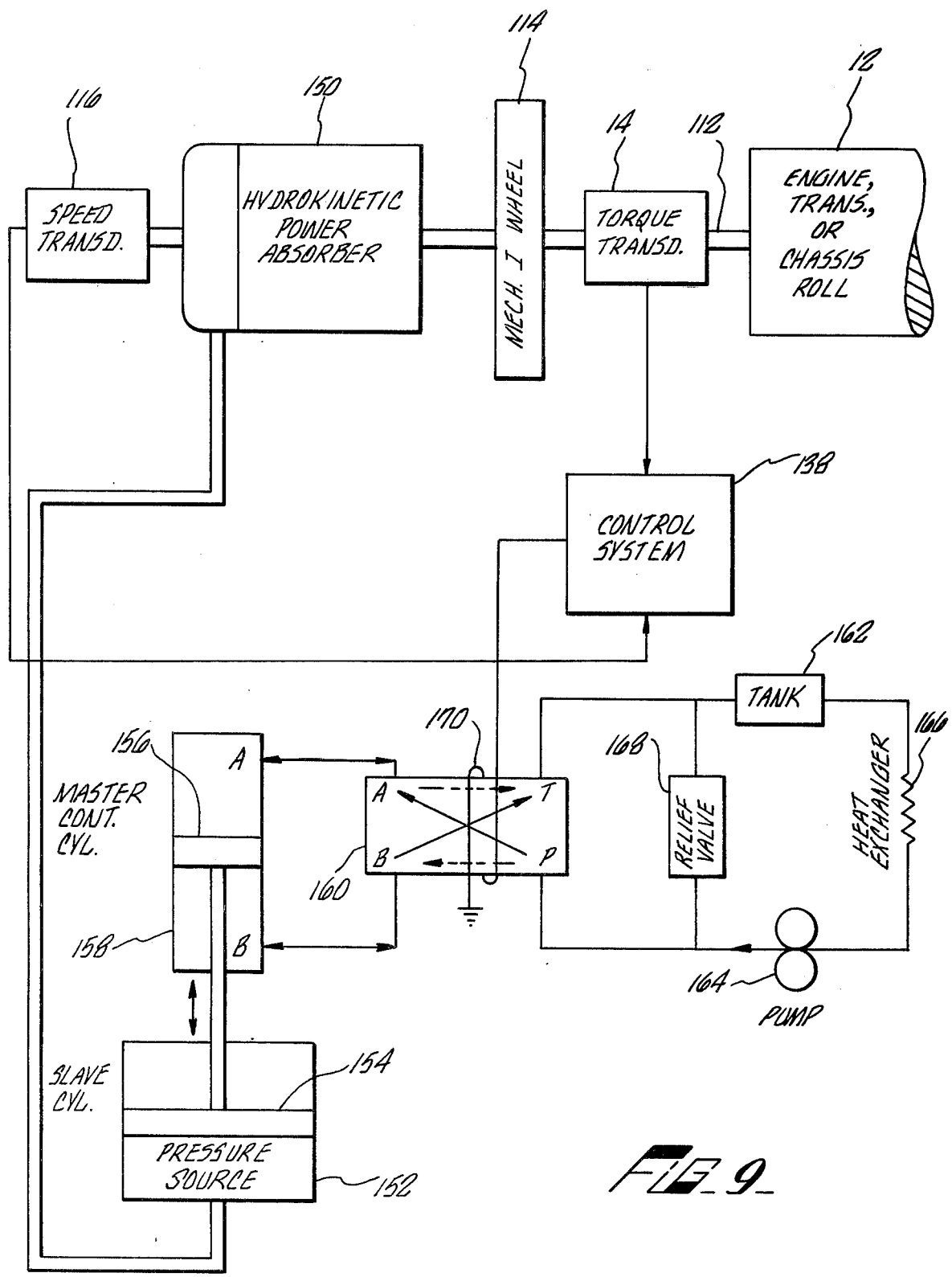
FIG. 9 is a block diagram of a system for controlling a hydrokinetic power absorption unit in accordance with the present invention.

Referring now to FIG. 9, a hydrokinetic power absorber 150 is connected to shaft 112 for absorbing torque from an engine under test to simulate a desired road load torque and a selected inertia during acceleration or deceleration depending upon the value of the selected inertia to the mechanical inertia of the system, as will be described.

The hydrokinetic power absorber 150 may be of the type described in U.S. Pat. No. 2,870,875. In this type of absorber, the absorbed torque follows substantially a cubed curve with changes in speed with a given level of fill of working fluid such as water. An increase in the level of working fluid results in an increase in the absorbed torque for a given speed and a decrease in the level of working fluid results in a decrease in the absorbed torque. Thus, at any given speed the torque absorbed by the hydrokinetic power absorber may be varied by changing the level of fill of the working fluid.

The level of fill of the working fluid in the absorber 150 is controlled by a slave cylinder 152. A slave piston 154 within the cylinder 152 forces fluid into or out of the power absorber 150 in response to the movement of a master piston 156 of a master double acting control cylinder 158 as illustrated. The master control cylinder defines chambers A and B on each side of the piston 156. These chambers are connected to ports A and B of a control spool valve 160. The valve 160 includes ports T and P which are connected to a hydraulic tank 162 and a hydraulic pump 164, respectively. A heat exchanger 166 is connected between the tank 162 and the pump 164 as shown and a suitable relief valve 168 is connected across ports P and T of the control valve 160. The valve 160 includes an actuating coil 170 which is connected to the output of the control system 138. The control system 138 may be as illustrated in FIG. 8.

When the output error signal from the control system 138 is positive, the valve 160 is actuated to connect port A to port P and port B to port T. This action supplies high pressure fluid from the pump 164 to chamber A of the double acting cylinder 158 and chamber B of the cylinder 158 is connected to the low pressure reservoir tank 162. The high pressure fluid in chamber A forces the piston 156 downwardly as shown in the diagram. This action forces the slave piston 154 downwardly to thereby force fluid into the power absorber increasing its level of fill of working fluid. This causes the power absorber 150 to absorb additional torque thereby tending to reduce the speed of the roll 12.

A negative error signal from the control system 138 actuates control valve 160 to connect chamber B of the double acting cylinder 158 to the pump 164 and chamber A to the tank 162. This action causes the piston 156 of the piston 154 to move upwardly in the diagram thereby removing working fluid from the power absorber. This action reduces the level of working fluid in the absorber and causes it to absorb less torque thereby tending to increase the speed of the roll 12.

If desired, solenoid valves of the type described in U.S. Pat. No. 3,818,754 may be used to supply or withdraw fluid from the absorber.

Since the power absorber 150 is capable only of absorbing torque and not delivering torque to the roll 12, the system of FIG. 9 can be used to simulate inertia only during (1) acceleration when the selected inertia from circuit 146 of FIG. 8 is less than the mechanical inertia of the rotating mass connected to the shaft 112, e.g., the flywheel 114, roll 12, etc., and (2) deceleration when the selected inertia is greater than the mechanical inertia of the rotating mass connected to shaft 112. Such an inertia simulation system may be used to (a) test vehicle brakes in the deceleration mode, and (b) test vehicle engine and driveline performance in the acceleration mode.

Figure 10:
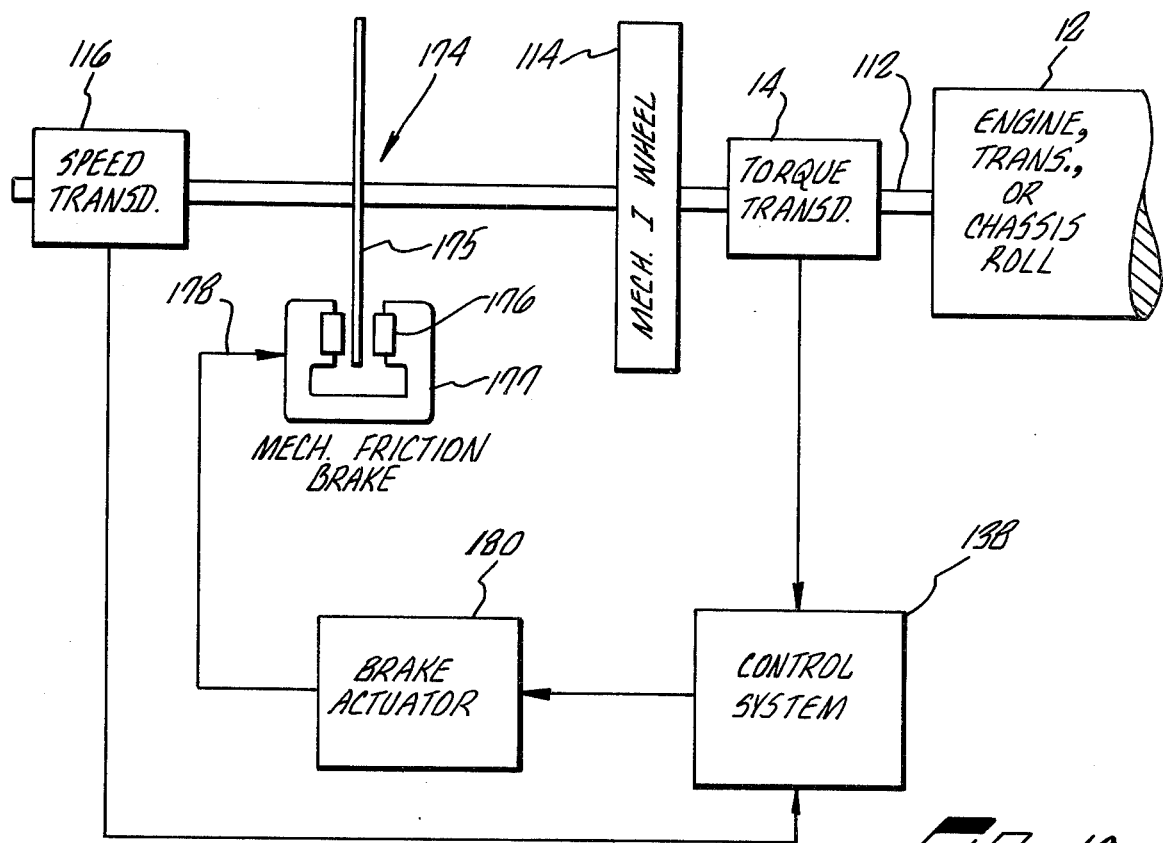
FIG. 10 is a block diagram of a system for controlling a mechanical friction brake absorber in accordance with the present invention.

Referring now to FIG. 10, a mechanical friction brake absorber 174 is coupled to the shaft 112. The brake includes a rotating disc 175 and a pair of brake pucks 176 which are forced against the disc 175 by a conventional electromagnetic actuator 177 in accordance with the value of the current applied to the actuator control circuit 178. A brake controller 180 is connected between the control system 138 and the actuator control circuit 178. The output current signal from the brake controller 180 may follow the same curve shown in FIG. 7 in which the current rises from a minimum value with a negative error signal input to the controller 180 to a maximum value with a positive error signal input. The brake 174 makes the actual speed of the roll 12 or vehicle engine connected to the shaft 112 match the computed speed by absorbing more or less torque. Since the mechanical friction brake absorber can only function in an absorbing mode like the hydrokinetic absorber discussed above, the system of FIG. 10 can simulate inertia during acceleration or deceleration depending upon the relationship between the values of the selected simulated inertia and the actual mechanical inertia.

Figure 11:
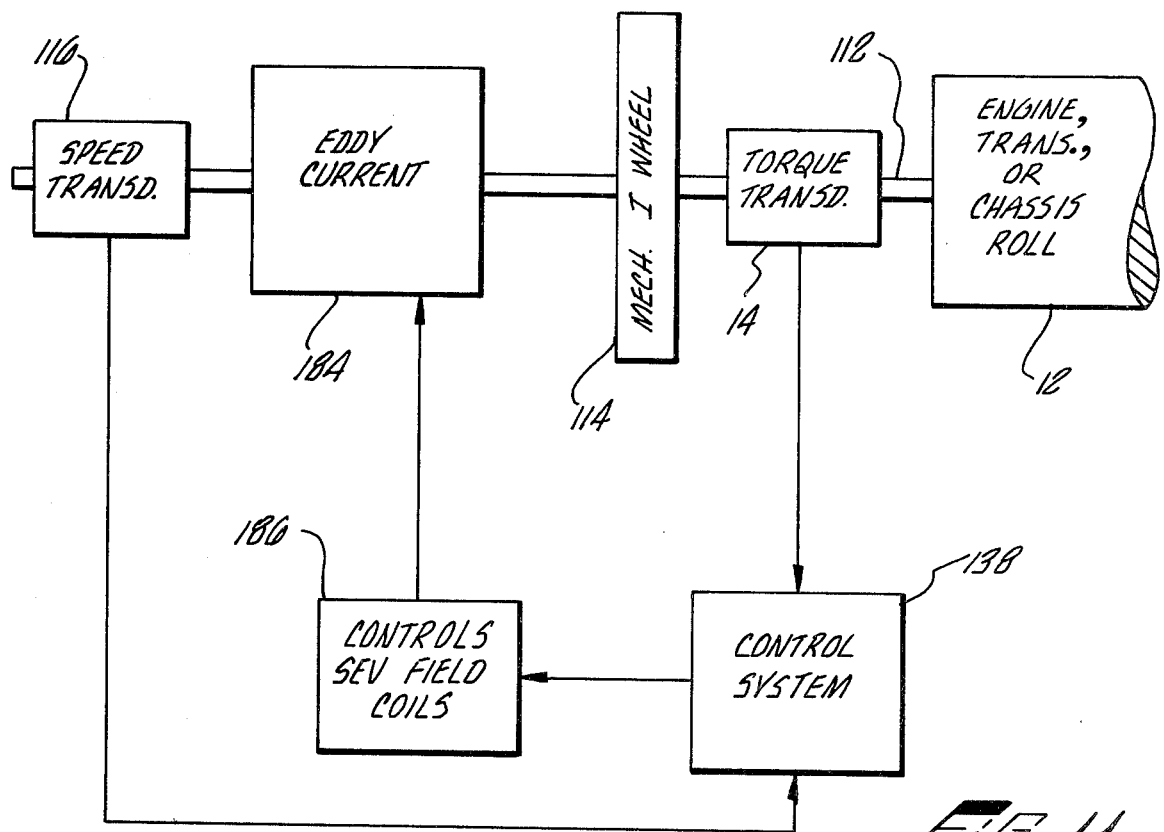
FIG. 11 is a block diagram of a system for controlling an eddy current absorber unit in accordance with the present invention.

Referring now to FIG. 11, an eddy current power absorption unit 184 is connected to the shaft 112. The eddy current power absorption unit 184 may be of the conventional type, for example, of the type supplied by Dynamatic Corporation, a subsidiary of Eaton, Yale and Towne Corporation of Cleveland, Ohio. A conventional type of eddy current absorption dynamometer is described in Bulletin DB-1 published November 1953 by the Dynamatic Corporation of Kenosha, Wisconsin. In principle, an eddy current absorption dynamometer absorbs a torque which varies with the excitation of the field coils and speed. Field excitation for the power absorber 184 is supplied by a controller 186 which receives as its input the error signal from the control system 138. The output current from controller 186 may also follow the curve shown in FIG. 7 by providing a maximum field excitation current when the error signal is positive and a minimum excitation current when the error signal is negative. The eddy current absorption unit will function in a manner similar to that described in connection with the friction brake absorber of FIG. 10 and the hydrokinetic absorber in FIG. 9.

Figure 12:
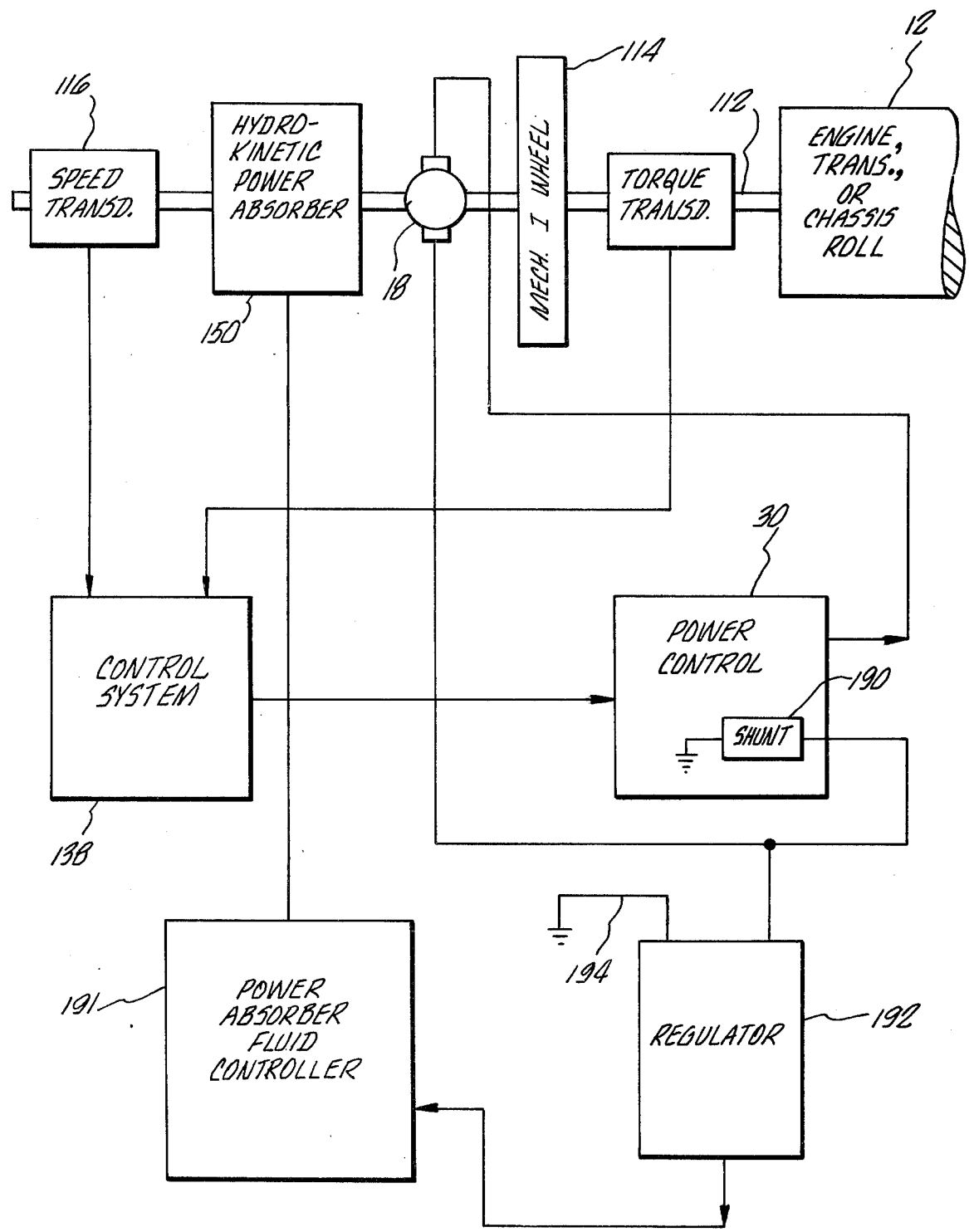
FIG. 12 is a block diagram of a system for controlling a hydrokinetic absorber and an electric motor coupled to same vehicle motor in accordance with the present invention.

FIG. 12 illustrates the use of a hydrokinetic power absorber and a DC motor for simulating the inertia and road load of a vehicle under test. The hydrokinetic power absorber 150 in FIG. 12 supplements the torque provided by the DC motor 18. A relatively small motor 18 may be used in this system to provide a fast response time for simulating inertia.

The control system for the DC motor 18 may be the same as that described with respect to FIGS. 1–5 with the armature of the DC motor 18 connected to the output of the power control 30. In this application, the power control 30 includes a shunt resistance 190 which is connected in series with the motor armature and ground as shown. The shunt resistance is very low so that the operation of the motor will not be adversely effected. The voltage across the shunt 190 is applied to one input of a regulator 192 in the form of a differential amplifier. The regulator 192 includes another input 194 connected to ground. The output of the regulator 192 represents the armature current of the motor 18. This regulator output signal is applied to a power absorber fluid controller 191 which includes cylinders 152 and 158, spool valve 160, pump 164 and tank 162 of FIG. 9. The controller 191 controls the level of fill of the working fluid within the power absorber 150 as discussed in connection with FIG. 9. Thus, the absorber 150 is controlled to remove load from the motor 18 when the motor is absorbing torque from the shaft 112. The motor 18 and absorber 150 function to match the actual speed of the shaft with the computed speed. The motor and absorber thus provide the precise motoring or absorbing torque necessary to match the simulated road load torque plus the simulated vehicle inertia.

There has thus been described an inertia simulator for testing vehicle engines which includes a power absorber coupled to the engine under test and a control system which computes the engine speed in the basis of the measured torque and road load and controls the absorber to exert torque which resists changes in engine speed, the resisting torque being proportional to the road load torque and the difference between the desired simulated inertia and the mechanical inertia of the simulator. Flywheels may be included in the simulator if desired to reduce the size of the required absorber.

It should be understood that the invention is not limited to the exact details of construction shown and described herein for obvious modifications will occur to persons skilled in the art.

What is claimed is:

1. An inertia and road load simulator for vehicles comprising:
    a roll for engaging at least one of the vehicle wheels;
    transducing means coupled with the roll for providing a measured torque signal proportional to the torque transmitted to the roll by at least one wheel of a vehicle;
    means coupled to the vehicle wheel for providing a measured speed signal proportional to the rotational speed of the wheel;
    means for providing a road load torque signal for a preselected simulated inertia;
    means responsive to the road load torque signal and the measured torque signal for providing a computed speed signal directly proportional to the difference between the measured torque signal and the road load torque signal and inversely proportional to the preselected simulated inertia; and
    means coupled to the roll for exchanging torque therewith and responsive to the computed and measured speed signals to exert a torque which resists speed change initiated by the vehicle, the resisting torque being proportional to the preselected simulated inertia and road load torque.

2. The subject matter set forth in claim 1 wherein the means for providing the road load torque signal is responsive to the computed speed signal.

3. The subject matter set forth in claim 1 wherein the means for providing the computed speed signal includes an integrating circuit for integrating the difference between the measured torque signal and the road load torque signal.

4. The subject matter set forth in claim 1, wherein the last-named means is a motor and further including fly wheel means coupled to the motor shaft for introducing a moment of inertia to the motor shaft during rotation thereby assisting the motor to develop the necessary inertia to simulate vehicle inertia and road load on the vehicle wheel.

5. The subject matter set forth in claim 4 together with:
    a fan to be placed adjacent a test vehicle;
    first hydraulic means coupled to the motor shaft for converting mechanical energy to hydraulic energy;
    second hydraulic means connected between the first hydraulic means and the fan;
    whereby both hydraulic means and the fan absorb energy from the motor shaft during acceleration of the vehicle and feed back energy to the motor shaft during deceleration.

6. The subject matter set forth in claim 5 wherein the fan is located in front of a test vehicle for directing an air flow rearwardly of the vehicle, the airflow speed being a function of roll speed.

7. An inertia and road load simulator for vehicle engines comprising:
    a motor having a shaft coupled to the vehicle engine drive shaft for exchanging torque therewith;
    transducing means coupled with the vehicle engine drive shaft for measuring the torque transmitted by the drive shaft;
    means coupled to the vehicle engine for measuring the rotational speed thereof;
    means for providing a road load torque signal for a preselected simulated inertia;

means responsive to the measured torque signal and the road load torque signal for providing a computed speed signal directly proportional to the difference between the measured torque and the road load torque and inversely proportional to the preselected simulated inertia;

means responsive to the computed and measured speed signals for controlling power flow to the motor and vehicle engine drive shaft, thus providing the desired simulation of vehicle inertia and road load to exert torque which resists speed change initiated by the engine, the resisting torque being proportional to the preselected simulated inertia and road load.

8. The subject matter set forth in claim 7, wherein the means for providing the road load torque signal is responsive to the computed speed signal.

9. The subject matter set forth in claim 7 wherein the means for providing the computed speed signal includes an integrating circuit for integrating the difference between the measured torque signal and the road load torque signal.

10. The subject matter set forth in claim 7 together with fly wheel means coupled to the motor shaft for introducing a moment of inertia to the motor shaft during rotation thereby assisting the motor to develop the necessary inertia to simulate vehicle inertia and road load on the vehicle engine drive shaft.

11. The subject matter set forth in claim 10 together with:
a fan to be placed adjacent a test vehicle engine;
first hydraulic means coupled to the motor shaft for converting mechanical energy to hydraulic energy;
second hydraulic means connected between the first hydraulic means and the fan;
whereby both hydraulic means and the fan absorb energy from the motor shaft during acceleration of the vehicle engine and feed back energy to the motor shaft during deceleration.

12. A method for simulating the inertia of and road load torque to a vehicle undergoing testing, comprising the steps:
permitting a vehicle wheel to exert torque on a roll;
measuring the torque exerted by the vehicle wheel;
computing the vehicle wheel speed as a function of measured torque, road load torque and preselected simulated inertia;
exerting torque on the roll to resist wheel speed changes initiated by the vehicle, the resisting torque being proportional to the preselected simulated inertia; and
measuring the actual speed of the vehicle wheel, and comparing the actual vehicle wheel speed value with the computed wheel speed value and generating a resultant error signal to correct the exerting torque toward achieving a zero error signal.

13. The method of claim 12 wherein the step of computing the vehicle wheep speed as a function of measured torque includes computing the desired road load torque of the vehicle at the actual vehicle wheel speed and deriving the difference between the measured torque and the road load torque.

14. The method of claim 13 wherein the step of computing the vehicle wheel speed as a function of measured torque further includes the step of integrating the difference between the measured torque and road load torque with time.

15. In an inertia simulator for vehicle engines, the combination which comprises:
transducing means coupled to the engine for providing a torque signal proportional to engine torque;
means for providing an inertia signal representative of a preselected simulated inertia for the vehicle;
power absorbing means coupled to the engine for exerting torque in opposition to the engine torque;
means for providing a road load signal representative of the desired torque load for the engine without acceleration;
means responsive to the torque and road load signals for providing a torque difference signal proportional to the difference between the torque and road load signals; and
control means responsive to the torque difference signal and to the inertia signal, at least when the engine is accelerating or decelerating for controlling the power absorbing means to exert torque which resists changes in engine speed, the resisting torque being proportional to the road load torque and the difference between the preselected simulated inertia and the mechanical inertia of the simulator.

16. The combination as set forth in claim 15 wherein the road load signal is a constant.

17. The combination as set forth in claim 16 wherein the road load signal is zero.

18. The combination as set forth in claim 15 wherein the road load signal varies as a function of time.

19. The combination as set forth in claim 15 wherein the road load signal varies as a function of engine speed.

20. The combination as set forth in claim 15 including speed transducing means coupled to the engine for providing a measured speed signal proportional to engine speed.

21. The combination as set forth in claim 20 wherein the control means includes means for computing the integral of the torque difference signal divided by the inertia signal with respect to time to obtain a computed speed signal.

22. The combination as set forth in claim 21 wherein the control means includes means for comparing the computed and measured speed signals to provide an error signal representative of the difference between the computed and actual speed of the engine.

23. The combination as set forth in claim 22 wherein the power absorbing means is a DC motor and wherein the control means controls the voltage across the motor armature in accordance with the value of the error signal.

24. The combination as set forth in claim 23 wherein the control means controls the DC motor to provide a resisting torque proportional to the road load torque and the difference between the preselected simulated inertia and the mechanical inertia of the simulator during the acceleration and deceleration of the engine.

25. The combination as set forther in claim 22 wherein the power absorbing means is a positive displacement hydrostatic pump/motor and including means for controlling the differential pressure across the pump/motor in accordance with the value of the error signal.

26. The combination as set forth in claim 25 wherein the control means controls the pump/motor to provide a resisting torque proportional to the road load torque and the difference between the preselected simulated inertia and the mechanical inertia of the simulator during the acceleration and deceleration of the pump/motor.

27. The combination as set forth in claim 22 wherein the power absorbing means is a hydrokinetic absorption unit having an absorbed torque which varies with the level of fill of a working fluid therein and including means for controlling the level of fill of the working fluid within the absorption unit in accordance with the value of the error signal.

28. The combination as set forth in claim 27 wherein the control means controls the absorption unit to provide a resisting torque proportional to the road load torque and the difference between the preselected simulated inertia and the mechanical inertia of the simulator during the acceleration of the engine.

29. The combination as set forth in claim 27 wherein the control means controls the absorption unit to provide a resisting torque proportional to the road load torque and the difference between the preselected simulated inertia and the mechanical inertia of the simulator during the deceleration of the engine.

30. The combination as set forth in claim 22 wherein the power absorbing means is a eddy current power absorption unit having field excitation coils and providing absorbed torque which varied with the magnitude of the excitation current applied to the coils and including means for controlling the current applied to the excitation coils of the absorption unit in accordance with the value of the error signal.

31. The combination as set forth in claim 30 wherein the control means controls the eddy current power absorption unit to provide a resisting torque proportional to the road load torque and the difference between the preselected simulated inertia and the mechanical inertia of the simulator during the acceleration of the engine.

32. The combination as set forth in claim 30 wherein the control means controls the eddy current power absorption unit to provide a resisting torque proportional to the road load torque and the difference between the preselected simulated inertia and the mechanical inertia of the simulator during the deceleration of the engine.

33. The combination as set forth in claim 22 wherein the power absorbing means is a friction brake absorption unit and includes means for controlling the braking force of the brake in accordance with the value of the error signal.

34. The combination as set forth in claim 33 wherein the control means controls the friction brake absorption unit to provide a resisting torque proportional to the road load torque and the difference between the preselected simulated inertia and the mechanical inertia of the simulator during the acceleration of the engine.

35. The combination as set forth in claim 33 wherein the control means controls the friction brake absorption unit to provide a resisting torque proportional to the road load torque and the torque and the difference between the preselected simulated inertia and the mechanical inertia of the simulator during the deceleration of the engine.

36. The combination as set forth in claim 22 wherein the power absorbing means includes a hydrokinetic absorption unit and a D.C. motor.

37. The combination as set forth in claim 36 wherein the control means controls the speed of the DC motor in accordance with the value of the error signal and controls the torque absorbed by the hydrokinetic absorption unit in accordance with the value of the armature current in the DC motor to tend to remove the torque load from the DC motor.

38. The combination as set forth in claim 37 wherein the simulator includes at least one mechanical flywheel.

39. An inertia simulator for vehicle engines which comprises:
transducing means coupled to the engine for providing a torque signal proportional to engine torque;
means for providing an inertia signal representative of a preselected simulated inertia for the vehicle;
power absorbing means coupled to the engine for exerting torque in opposition to the engine torque;
means for providing a speed signal representative of the speed of the engine;
road load simulating means responsive to the speed signal for providing a road load signal which simulates the torque required for steady state operation at the engine speed represented by the speed signal;
means responsive to the torque and road load signals for providing a torque difference signal proportional to the difference between the torque and road load signals;
control means responsive to the torque difference signal and to the inertia signal, at least when the engine is accelerating for controlling the power absorbing means to exert torque which resists changes in engine speed, the resisting torque being proportional to the road load torque and the difference between the preselected simulated inertia and the mechanical inertia of the simulator.

40. The combination as set forth in claim 39 wherein the control means includes integrating means for providing a computed speed signal which is inversely proportional to the inertia signal and directly proportional to the integral of the torque difference signal with time.

41. The combination as set forth in claim 40 wherein the power absorbing means is an electric motor having a shaft coupled to the engine shaft for exchanging torque therewith and wherein the control means controls power to the motor to cause the motor to exert torque which resists speed change initiated by the engine during acceleration and deceleration.

42. The combination as defined in claim 40 wherein the control means includes means for comparing the computed and measured speed signals.

* * * * *